United States Patent [19]
Stinchcomb

[11] 3,780,653
[45] Dec. 25, 1973

[54] SEISMIC INHIBIT CIRCUIT FOR RF MINE SENSOR

[75] Inventor: Raymond G. Stinchcomb, Glen Burnie, Md.

[73] Assignee: The United States of America as represented by the Secretary of the Army, Washington, D.C.

[22] Filed: Sept. 7, 1971

[21] Appl. No.: 178,445

[52] U.S. Cl............................ 102/19.2, 102/70.2 P
[51] Int. Cl...................... F42b 23/26, F42b 21/38
[58] Field of Search.................. 102/8, 18, 19, 19.2, 102/70.2 R, 70.2 GA, 70.2 P, DIG. 6; 246/249, 251, 330, 360, 112

[56] References Cited
UNITED STATES PATENTS

| | | | |
|---|---|---|---|
| 2,411,787 | 11/1946 | Hammond | 102/18 X |
| 2,448,020 | 8/1948 | Darnell | 102/8 |
| 3,094,929 | 6/1963 | McGinley et al. | 102/18 |
| 3,170,399 | 2/1965 | Hinman | 102/19.2 |

Primary Examiner—Benjamin A. Borchelt
Assistant Examiner—James M. Hanley
Attorney—Harry M. Saragovitz et al.

[57] ABSTRACT

An inhibiting circuit used in conjunction with a means for detecting the presence of personnel and other moving objects and detonating a mine proximate thereto. The circuit includes a seismic transducer positioned to detect vibrations of relatively heavy moving objects and provide an output signal responsive to such movement, which is then amplified, rectified, filtered, and inverted. The inverted output, which is at ground level only when a seismic signal is present and at some positive level at all other times, is applied to one input of an inhibit gate. The other inhibit gate input is derived from the output of said detecting means which consists of a positive signal when it detects a moving object. The output of the gate is connected to the control element of a silicon controlled rectifier that in turn is connected to detonate a selected land mine. Thus, the mine will only be detonated upon receipt of the positive output of the gate which is dependent on having applied thereto a pair of positive inputs. Such inputs are only present in the absence of a seismic signal and in the presence of a moving object. Therefore the mine cannot be detonated by a large, heavy, moving object such as a tank.

10 Claims, 2 Drawing Figures

3,780,653

SEISMIC INHIBIT CIRCUIT FOR RF MINE SENSOR

The invention described herein may be manufactured, used and licensed by or for the Government for governmental purposes without the payment to me of any royalty thereon.

BACKGROUND OF THE INVENTION

The present invention relates to detonation systems for mines and more particularly pertains to a seismic inhibit circuit for preventing the activation of personnel land mines by large moving vehicles such as tanks, where the sensor is an r.f. detector for sensing the presence of a moving object or person.

In the field of anti-personnel mines which employ sensing devices, it has been the general practice to employ pressure sensitive probes, plates or trip wires to properly activate the mines in the presence of an enemy.

In some instances, these mines can be located by careful inspection, probing or through the use of sensitive electronic mine detection equipment. Upon location, the mines can be either defuzed or exploded. Those mines having probes or trip wires are generally cleared by directing armored vehicles through the area. Thus it is clear that an entire area of anti-personnel mines can be cleared with the use of a vehicle. The problem therefore is to inhibit or prevent activation of the mine by a vehicle while being readily detonated by personnel. The problem is even more acute where the mine is activated by a command signal transmitted from a remote sensor which detects movement within the sphere of the mine since the vehicle need not pass near or directly over the concealed mine. The present invention fills the need of providing a seismic sensor for detecting the presence of a vehicle and inhibiting the action or activation of the mine during such presence, even when the command signal is transmitted. This form of device can also be used with a remote sensor and directly inhibit the mine detonation.

SUMMARY OF THE INVENTION

The general purpose of this invention is to provide a detonation system for anti-personnel land mines that has all the advantages of similarly employed prior art devices and none of the above-described disadvantages. To attain this, the present invention provides a unique circuit which includes a seismic detector or transducer positioned for sensing the presence of a moving vehicle and supplying an output relative thereto, to an amplifier which, in turn, has its output connected to a rectifier and a low frequency filter. After being filtered the signal is inverted so that where a seismic signal is present the inverter output will be at low or ground potential. This inverted output is applied to one input of an inhibit or AND gate whose output, when positive, will trigger a silicon controlled rectifier (SCR) that in turn activates the mine. The other input to the inhibit gate is derived from the wide area sensor and consists essentially of a fire command signal for the SCR when movement is detected in the area of the mine. The command fire signal is inhibited from activating the mine during the entire period of a seismic signal generated by a moving vehicle.

An object of the present invention is to provide a mine detonation system in which the sighting sensor is inhibited from firing the antipersonnel mine in the presence of a moving vehicle.

Another object is the provision of a simple, reliable, inexpensive circuit for inhibiting the action of a sensor in the presence of seismic signal.

Still another object is to provide for a wide area RF type sensing fuze, an interposed inhibit circuit which will prevent detonation of the fuze by the RF sensor in the presence of a moving vehicle.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
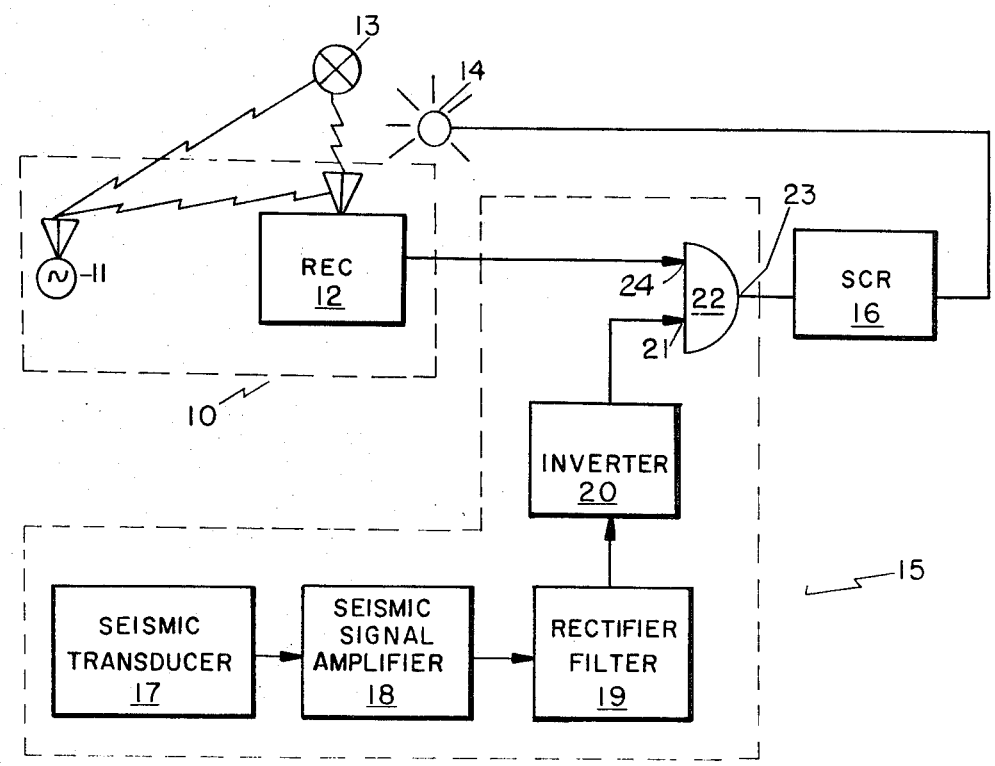
FIG. 1. is a block diagram of an embodiment made in accordance with the principle of this invention; and, FIG. 2 is a schematic of the embodiment of FIG. 1.

In the illustrated embodiment of FIG. 1, an r.f. wide area sensor 10 which includes a centrally disposed r.f. transmitter 11 and a plurality of spaced receivers 12, only one of which is shown, are employed to detect the presence of a moving object 13 (i.e., personnel). The principle of detection relies upon a moving object changing the phase of a reflected signal arriving at a remote receiver relative to the phase of the signal which is received directly from the transmitter. Addition of the received signals provides an output signal dependent on their phase relation with the movement of the reflecting object causing fluctuation in the total received signal as a function of successive cancellation and reinforcement based on the motion of the object. Moving objects may therefore be readily identified and logic circuitry within the receiver can effect a command signal to detonate the anti-personnel land mine 14 by triggering a silicon controlled rectifier connected directly to the mine fuze.

It is clear from the foregoing that the moving object can also be a vehicle which will detonate the mine, an action which is undesirable for an anti-personnel device. In order to eliminate detonation by a moving vehicle, the seismic inhibit circuit 15 is interposed between the wide area radar sensor 10 and the SCR 16. A seismic transducer pickup 17, which converts the terrestrial vibrations into an electrical signal, is disposed proximate the area within which the mines are located and is connected to apply its output to a signal amplifier 18. The amplified signal is then rectified and filtered at 19 and thereafter the signal is inverted at 20 and applied to one input 21 of inhibit gate 22. The truth table of the gate 22 is such that two positive level signals must appear at its inputs to provide a positive output at 23. The other input 24 of the gate receives the output command rectified signal from the receiver 12. The inverted seismic signal serves to inhibit the gate in the presence of a signal generated by the movement of a heavy body. Thus, the SCR 16 cannot fire the mine during this period.

Figure 2:
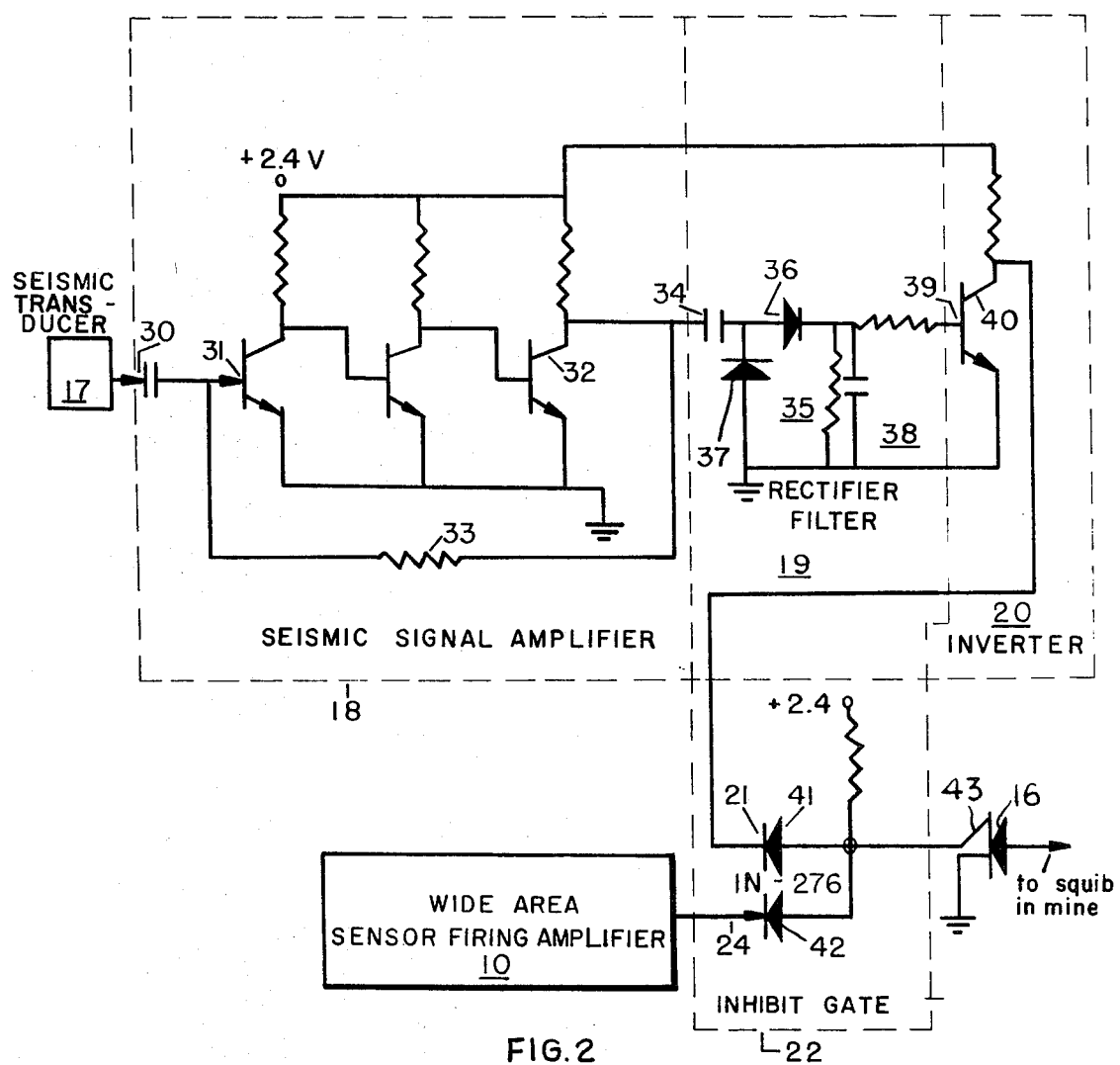

FIG. 2 illustrates in schematic form the embodiment of FIG. 1 wherein, the seismic signal generated by transducer 17, which may be a Hall Sears Model HS-J Mod K, is applied through input capacitor 30 to the base 31 of the first stage of the three seismic transistor amplifier 18 so as to provide sufficient gain of the extremely low level input signal and permit rectification. In order to provide fidelity the amplifier includes a feedback loop from the output collector 32 via resistor 33 back to the input base 31. The amplified output signal is coupled via capacitor 34 to the rectifier section 35 of Rectifier-Filter 19 which includes diodes 36 and 37. The rectified signal is then filtered by R-C filter section 38 to provide only the low frequency signal components. Since the inhibit gate 22 will only provide an output when two positive level signals are applied to its input, then, in order to inhibit during the seismic signal, the seismic signal input to the gate must be negative or low level. This is accomplished simply by inverting the signal, namely, applying the filtered seismic signal to the base 39 of inverter 20 and coupling the resulting output at collector 40 to input 21 of diode 41 of gate 22. The other gate diode 42 receives the postive command signal from the wide area sensor 10 at input 24 and the inhibit gate output is connected to the control or trigger electrode 43 of SCR 16 which, when fired thereby, will activate the squib of other initiator at the mine. Summarizing, the inhibit gate is actually a two input AND gate so that both inputs are required to be at a positive level in order to trigger the SCR. If no seismic signal is present the output of the inverter is at a positive level and therefore if the wide area sensor provides a command signal the SCR will be triggered to detonate the mine. Where the seismic signal is present the inverter output is at ground level thereby inhibiting the positive command signal from detonating the mine.

The technique or method of this invention can be readily characterized by the following steps:

detecting the seismic vibrations generated by a large moving object such as a tank by means of a transducer 17 and thereafter, converting the vibrations into an electrical signal and then successively, amplifying at 18 rectifying and filtering, at 19, the converted signal, inverting the processed seismic electrical signal and thereafter, gating off an "AND" gate 22 in the presence of the command signal.

It should be understood, of course, that the foregoing disclosure relates only a preferred embodiment of the invention and that numerous modifications or alterations may be made therein without departing from the spirit and the scope of the invention as set forth in the appended claims.

I claim:

1. In a system for sensing the presence of a moving object such as a person, and upon such detection providing a command signal to the electrical detonator of a mine for detonation thereof, an inhibit circuit for preventing detonation in the presence of a heavy moving object such as a vehicle which comprises:

a seismic detection means for providing an output signal only in the absence of seismic vibrations proximate said mine, an inhibit means having a pair of inputs and providing an output only during the simultaneous application of input signals at both of said pairs of inputs, means connecting said command signal to one of said pair of inputs and connecting the output of said seismic means to the other of said pair of inputs, whereby when said output of said inhibit means is connected to said detonator said system will only detonate said mine in the absence of a seismic signal.

2. The system according to claim 1 wherein said seismic detection means includes:

a seismic transducer for providing a seismic electrical signal output coupled to the input of a signal inverter having its output connected to said one of said pair of inhibit means inputs.

3. The system according to claim 2 wherein said inhibit means is an AND gate.

4. The system according to claim 3 wherein said AND gate includes a pair of diodes having their outputs coupled together.

5. The system according to claim 4 further including:

the series combination of a rectifier and a filter connected intermediate said transducer and said inverter.

6. The system according to claim 5 wherein said detonator includes a silicon controlled rectifier having its trigger electrode connected to said output of said AND gate for activating said mine.

7. The system according to claim 6 including a wide area sensor which includes an r.f. transmitter for generating a radiated signal, a receiver spaced from said transmitter for receiving both said direct radiated signal and said radiated signal reflected from an object and providing a command signal only when said object is in motion and proximate said mine.

8. The method of inhibiting a command signal in the presence of a heavy moving object which includes the steps of:

detecting the seismic vibrations generated by said object, converting said vibrations into an electrical signal, inverting said electrical signal, gating said command signal with said inverted signal.

9. The method according to claim 8 further including:

amplifying, rectifying and filtering said converted signal prior to said step of inverting.

10. The method according to claim 9 wherein said gating is gating off in an AND gate.

* * * * *